(12) United States Patent
Van Mill et al.

(10) Patent No.: US 7,205,490 B2
(45) Date of Patent: Apr. 17, 2007

(54) LOAD MEASURING SYSTEM AND METHOD FOR GRAIN CART

(75) Inventors: Michael Van Mill, Shell Rock, IA (US); Alan Gustafson, Aplington, IA (US); Ron Schlimgen, Waverly, IA (US)

(73) Assignee: Unverferth Manufacturing Co., Inc., Shell Rock, IA (US)

( * ) Notice: Subject to any disclaimer, the term of this patent is extended or adjusted under 35 U.S.C. 154(b) by 144 days.

(21) Appl. No.: 11/032,089

(22) Filed: Jan. 11, 2005

(65) Prior Publication Data

US 2006/0151217 A1    Jul. 13, 2006

(51) Int. Cl.
G01G 19/08    (2006.01)
(52) U.S. Cl. .................................. 177/136
(58) Field of Classification Search ......... 177/136–139
See application file for complete search history.

(56) References Cited

U.S. PATENT DOCUMENTS

| | | | |
|---|---|---|---|
| 3,241,626 A * | 3/1966 | Woodburn | 177/137 |
| 3,279,550 A | 10/1966 | Kersten | |
| 3,508,623 A * | 4/1970 | Greenstein | 177/137 |
| 4,362,097 A * | 12/1982 | Rogers | 100/99 |
| 4,371,299 A | 2/1983 | Cain et al. | |
| 4,623,029 A * | 11/1986 | Bambauer et al. | 177/137 |
| 4,694,921 A | 9/1987 | Johnston | |
| 5,861,581 A * | 1/1999 | Evans et al. | 177/136 |
| 6,150,617 A | 11/2000 | Hart et al. | |
| 6,259,041 B1 | 7/2001 | Dohrmann | |
| 6,313,414 B1 | 11/2001 | Campbell | |
| 6,396,003 B1 | 5/2002 | Friesen | |
| 6,590,168 B2 * | 7/2003 | Kawaguchi et al. | 177/136 |
| 6,624,363 B2 | 9/2003 | Orlando et al. | |
| 2003/0062096 A1 | 4/2003 | Zaun et al. | |

* cited by examiner

Primary Examiner—Randy W. Gibson
(74) Attorney, Agent, or Firm—Rothwell, Figg, Ernst & Manbeck, P.C.

(57) ABSTRACT

A load measuring system for a grain cart that includes an axle pivotably coupled with a frame of a grain holder. The load measuring system includes load cells positioned between a portion of a frame of the grain holder and the top of the axle of the grain cart; and a processing unit coupled with the load cells and configured to calculate a weight of a load in the grain holder based on a force applied to the load cells by said frame.

26 Claims, 3 Drawing Sheets

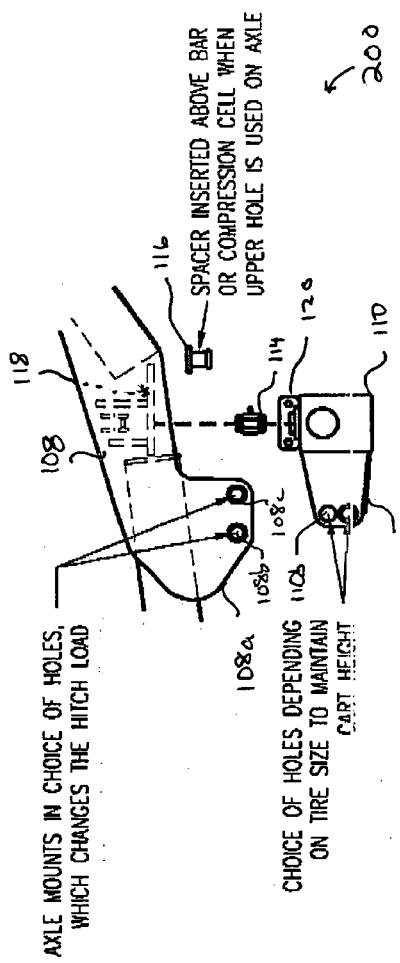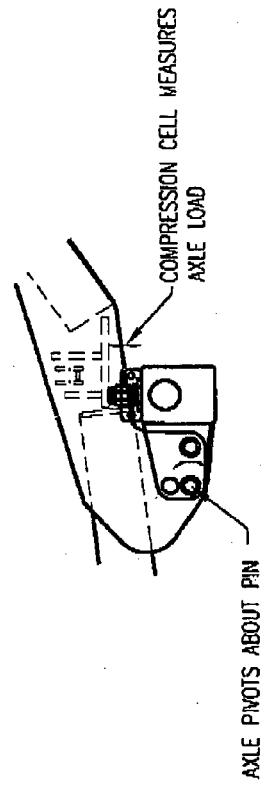

US 7,205,490 B2

LOAD MEASURING SYSTEM AND METHOD FOR GRAIN CART

BACKGROUND OF THE INVENTION

1. Field of the Invention

The present invention relates to vehicle load measuring systems, and in particular, to a novel load measuring system for a grain cart.

2. Description of the Related Art

Load carrying devices and vehicles, such as trucks, grain carts, etc., are often outfitted with load measuring systems. Such load measuring systems for vehicles have been implemented in a number of different configurations. These systems may utilize a number of devices, such as variable resistance devices, hydraulic devices, strain gauges and load cells to perform measurements.

Prior systems have the disadvantage that the distribution of the load can affect the measuring thereof. For example, U.S. Pat. No. 3,279,550 is directed to a truck load measure system. The load measuring system is mounted between a center support and the load carrying device, e.g., in a cement truck, between the cement container and the chassis. This system is subject to possible errors in measurement when the load is not properly distributed throughout the load carrying device.

Thus, there is a need for new and improved systems and methods for load measuring in vehicles that more reliably measure the weight of their load.

SUMMARY OF THE INVENTION

According to one embodiment of the present invention, a pivoting coupling is provided for a grain cart axle that includes compression cells located between the axle and a support beam for the grain carrier. The compression cells replace support bars when a scale system is desired. The pivot point is forward of the axle and provides multiple engaging means (e.g., holes) that allow for adjustment of the pivot point based on the cart height. A spacer may be provided to maintain contact between the support bar and compression cell. Weight of the load is determined from the force from the load onto the compression cells, which is proportional to the total load.

According to another embodiment of the present invention, a load measuring system is provided for a grain cart having an axle pivotably coupled with a frame of a grain holder. The system includes load sensing devices positioned between a portion of a frame of the grain holder and the top of the axle of the grain cart at a pivot point, and a processing unit coupled with the load cells and configured to calculate a weight of a load in the grain holder based on a force applied to the load cells by the frame According to another embodiment of the present invention, an axle coupling is provided for a grain cart having a load measuring system and a hopper mounted on a frame for holding grain. The coupling includes a flange attached to a forward surface of a grain cart axle and a coupler attached with a frame of the grain cart, pivotably coupled with the flange to allow rotation about an axis parallel with said grain cart axle. The coupling also includes a load measuring sensor positioned between a bottom portion of the frame of the grain cart and a top surface of the grain cart axle, and configured to output a single having a value proportional to the weight of the hopper of the grain cart.

According to another embodiment of the present invention, a grain cart is provided having a load measuring system. The grain cart includes a cart frame; a grain holder mounted to the cart frame; an axle having engaging means for accepting a pivoting coupling with a coupler; and a coupler connected to the frame. The coupler includes engaging means for pivotably coupling with the engaging means of the. At least one load sensing device is positioned between a portion of the frame and a top portion of the axle at the coupler. The weight of the grain holder is calculated based on the force of the portion of the frame applies to the at least one load sensing device.

One advantage of the configuration is that load measuring should not be affected by the placement of the load within the cart (i.e., in the hopper). That is, other systems may give different readings if the load of forward or rearward of the axle.

Further applications and advantages of various embodiments of the present invention are discussed below with reference to the drawing figures.

BRIEF DESCRIPTION OF THE DRAWINGS

FIG. 2a is an exploded view of an unassembled axle coupling according to an embodiment of the present invention;

FIG. 2b is an exploded view of an assembled axle coupling according to an embodiment of the present invention.

DETAILED DESCRIPTION OF THE PREFERRED EMBODIMENTS

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

Figure 1:
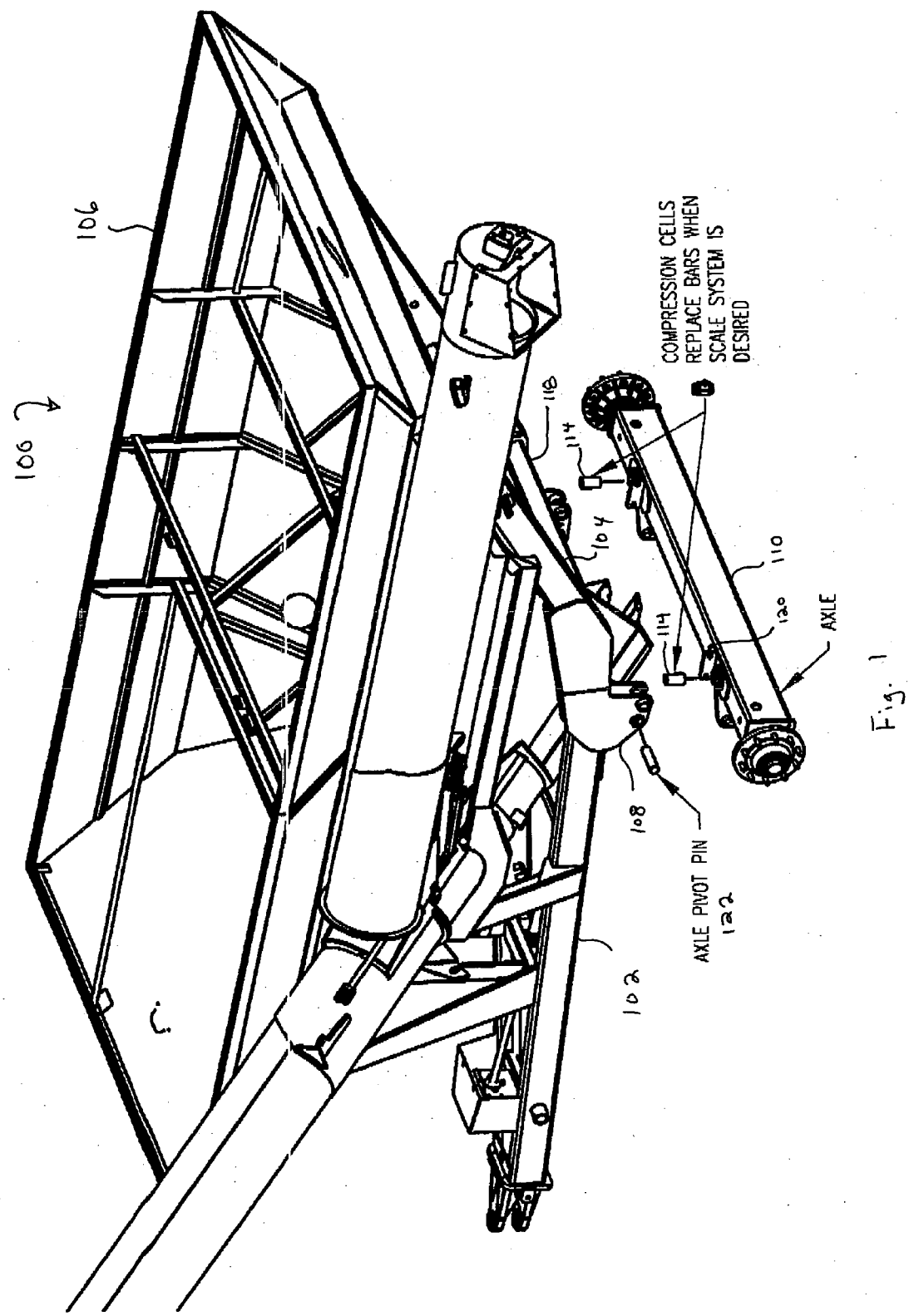
FIG. 1 is a diagram showing a grain cart according to an embodiment of the present invention.

FIG. 1 is a diagram showing an exemplary grain cart according to an embodiment of the present invention. The grain cart 100 includes a frame 102 and support beam 104 that provides support for a grain carrier or hopper 106. The cart 100 includes a pivoting coupling 108 at the base of the support beam 104. The coupling 108 is pivotably secured to an axle 110. In this embodiment, the coupling 108 is shaped to or allows the frame close to the coupling to rest upon the axle 110 while being pivotably secured at the forward side of the axle such as by a pivot pin 112. Load compression cells 114 can be positioned between the axle 110 and the coupling 108. The compression cells 114 may be electronically connected to a load indicating means (not shown—see FIG. 3). The frame of the cart is able to pivot about an axis through pin 122, parallel to the length of axle 110.

FIG. 2a shows an exploded view of the unassembled pivoting coupling 200 (108/112). The compression cells 114 are position onto a holder 120 on top of the axle 108. Cross beam 118 has a flat portion that makes contact with the top of the compression cells 114 when the coupling 108 is coupled with the axle 110. Alternatively, coupling 108 could include a plate for contacting the compression cells 114.

Coupling 108 has a flanged portion 108a shaped to extend below the top of the axle 110. The flanged portion 108a includes pivoting engaging means (e.g., holes) 108b,c. A flange 110a extends forward from the axle 108 and is preferably integral with axle 110 (i.e., welded). Flange 110a includes pivoting engaging means 110b,c, which may be mated with engaging means 108b,c of the coupling 108. A pin 122 is used to mate one of engaging means 108b,c with one of engaging means 110b,c. By providing multiple engaging means on both the coupling 108 and the axle 110, the coupling of the grain holder to the axle is adjustable.

FIG. 2b shows the assembled coupling 200. As shown, when the coupling 108 is coupled with the axle 110, beam 118 contacts with the compression cells 114. Pin 122 pivotably couples engaging means from the coupler 108 with the flange 108a of the axle 110—shown here, engaging means 110c is coupled with engaging means 108b. The pin 122 bears no portion of the total vertical load. As load is increased, beam 118 rotates about an axis thought the center of pin 112. As a result, the force applied to the load cells 114 by the beam 118 is proportional to the load, and therefore, the load may be calculated form the output of the load cells 114.

Since the load compression cells 114 are placed at the axle 110 of the grain cart 100, the load measuring system has the advantage that it prevents error caused by shifting of the load within the hopper 106.

One having skill in the art will recognize that the position of the pivot point where the coupling 108 is pivotably coupled with the axle 110 may be selected depending upon requirements, such as, for example, the selection of tire size, to maintain cart height or alignment with a towing vehicle.

A spacer bar 116 may be inserted above the compression cells when the upper engaging means 110b is used for coupling.

The compression cells 114 may be replaced with bars 124 when load measuring is undesired.

Figure 3:
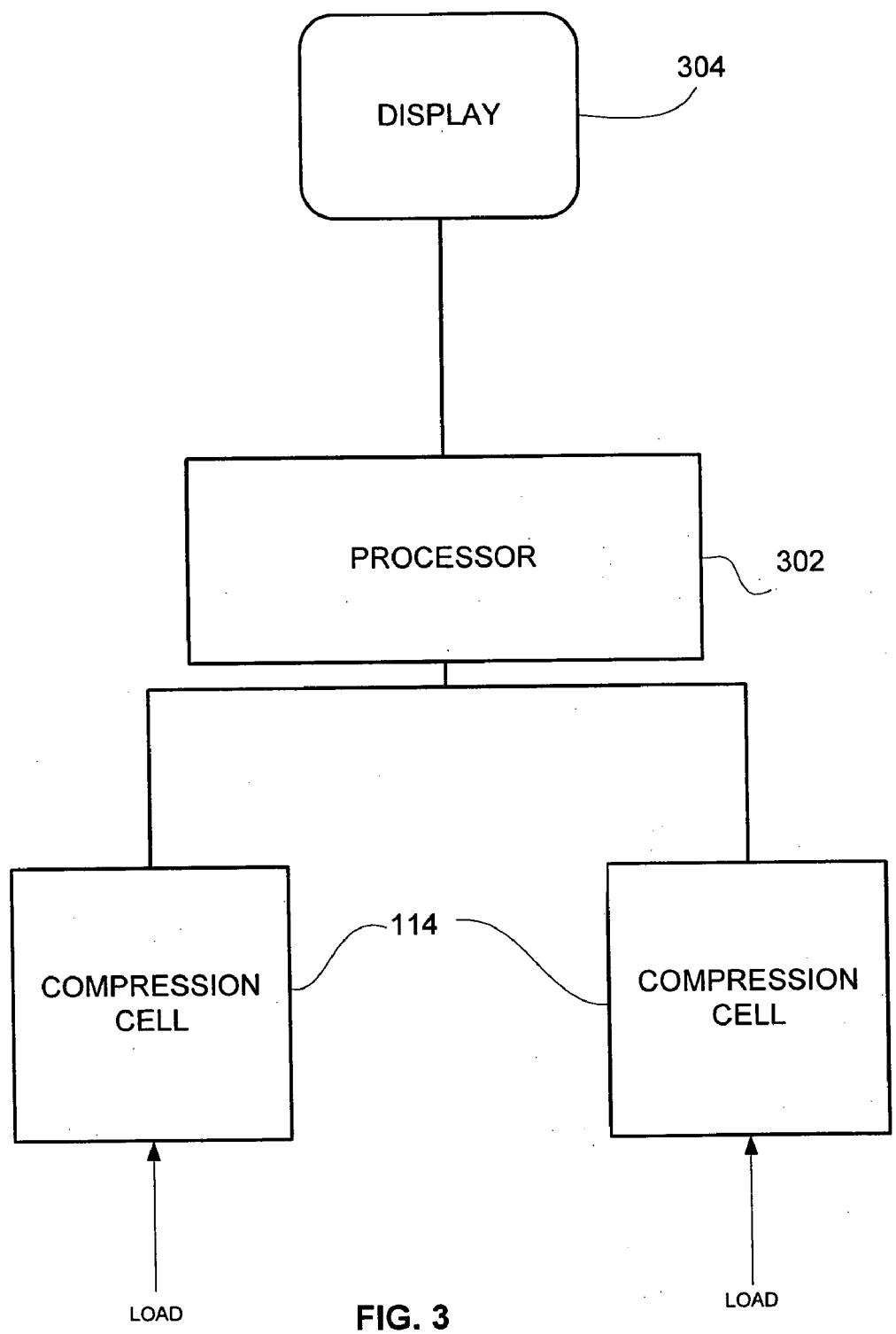
FIG. 3 is a block diagram of a load measuring system according to an embodiment of the present invention.

FIG. 3 is a block diagram of the load measuring system. As shown, the compression cells 114 are connected to a processor 302, which in turn is connected to a display device (e.g., gauge). When a load is applied to the compression cells 114, the cells 114 transmit a signal to the processor 302 indicative of the load. The processor 302 is configured to calculate the weight of the load based upon the signal from the compression cells 114. The weight of the load is proportional to measured load. The calculated weight of the load may be displayed on a display means mounted on the cart, in the vehicle towing the cart, etc.

One skilled in the art will recognize that the present invention is not limited to any particular software, hardware or firmware, or configurations thereof.

Thus, a number of preferred embodiments have been fully described above with reference to the drawing figures. Although the invention has been described based upon these preferred embodiments, it would be apparent to those of skill in the art that certain modifications, variations, and alternative constructions could be made to the described embodiments within the spirit and scope of the invention.

We claim:

1. A load measuring system for a grain cart, the grain cart including an axle pivotably coupled with a frame of a grain holder, said system comprising:
   load sensing devices positioned between a portion of a frame of the grain holder and the top of the axle of the grain cart at a pivot point; and
   a processing unit coupled with said load cells and configured to calculate a weight of a load in said grain holder based on a force applied to said load cells by said frame.

2. The system of claim 1, wherein the weight of the load is calculated as proportional to the force applied to said load cells by said frame.

3. The system of claim 1, further including spacers positioned between said portion of the frame of the grain holder and a top of the load sensing devices.

4. The system of claim 1, wherein said load sensing devices comprise compression cells.

5. A grain cart having a load measuring system, comprising:
   a cart frame;
   a grain holder mounted to said cart frame;
   an axle having engaging means for accepting a pivoting coupling with a coupler;
   a coupler connected to said frame, said coupler including engaging means for pivotably coupling with said engaging means of said axle; and
   at least one load sensing device positioned between a portion of said frame and a top portion of said axle at said coupler;
   wherein a weight of the grain holder is calculated based on the force of said portion of said frame applies to said at least one load sensing device.

6. The grain cart of claim 5, wherein the axle engaging means is coupled with the coupler engaging means by a pin.

7. The grain cart of claim 5, wherein said at least one load sensing device comprises a compression cell.

8. The grain cart of claim 5, further comprising a processor unit connected with said at least one load sensing device, and a display unit,
   said processor unit configured to calculate said weight of said grain holder based on an output from said at least one load sensing device and to display the calculated weight onto said display.

9. The grain cart of claim 5, wherein said weight is calculated as being proportional to the measured force of said portion of said frame applied to said at least one load sensing device.

10. The grain cart of claim 5, wherein said axle comprises a flanged portion and said axle engaging means comprise a plurality of holes through said flanged portion of said axle.

11. The grain cart of claim 5, wherein said coupler comprises a flanged portion and said coupler engaging means comprise a plurality of holes through said flanged portion of said coupler.

12. The grain cart of claim 5, wherein said axle comprises a flanged portion extending forward of said axle, said axle engaging means comprise a plurality of holes through said flanged portion; said coupler comprises a flat portion extending over a top surface of said axel and a flanged portion extending downward to engage with said flanged portion of said axle, said coupler engaging means comprise a plurality of holes through said flanged portion of said coupler, said grain cart further comprising a pin mating one of said plurality of holes of the axle engaging means with one of said plurality of holes of the coupler engaging means.

13. The grain cart of claim 5, further comprising at least one rod which is adapted to replace said at least one load sensing device.

14. An axle coupling for a grain cart having a load measuring system, the grain cart including a hopper mounted on a frame for holding grain, said coupling comprising:
   a flange attached to a forward surface of a grain cart axle;
   a coupler attached with a frame of the grain cart, pivotably coupled with said flange to allow rotation about an axis parallel with said grain cart axle; and a load measuring sensor positioned between a bottom portion of the frame of the grain cart and a top surface of the grain cart axle, and configured to output a single having a value proportional to the weight of the hopper of the grain cart.

15. The axle coupling of claim 14, wherein said load measuring sensor comprises a compression cell.

16. The axle coupling of claim 14, further comprising a processor connected with said load measuring sensor to receive said output signal of said load measuring sensor, said processor configured to calculate said weight of said hopper based upon said output signal.

17. The axle coupling of claim 16, further comprising a display means for displaying said calculated weight.

18. A load measuring system for a grain cart, the grain cart including an axle pivotably coupled with a frame of a grain holder, said system comprising:
- load sensing means for measuring an amount of force applied thereto and outputting a signal of the measured amount of force, said load sensing means positioned between a portion of a frame of the grain holder and the top of the axle of the grain cart at a pivot point; and
- a processing means for calculating a weight of a load in said grain holder based on the output of said load sensing means.

19. The system of claim 18, wherein said processing means calculates the weight of the load as proportional to the force applied to said load cells by said frame.

20. The system of claim 18, further including spacers positioned between said portion of the frame of the grain holder and a top of the compression cells.

21. The system of claim 18, wherein said load sensing means comprise compression cells.

22. A grain cart having a load measuring system, comprising:
- a cart frame;
- a grain holder mounted to said cart frame;
- an axle having engaging means for accepting a pivoting coupling with a coupler;
- a coupling means for pivotably coupling said frame with said engaging means of said axle; and
- at least one load sensing device positioned between a portion of said frame and a top portion of said axle at said coupler;
- wherein a weight of the grain holder is calculated based on the force of said portion of said frame applied to said at least one load sensing device.

23. The grain cart of claim 22, wherein the axle engaging means is coupled with the coupling means by a pin.

24. The grain cart of claim 22, wherein said at least one load sensing device comprises a compression cell.

25. The grain cart of claim 22, further comprising a processor unit connected with said at least one load sensing device and configured to calculate said weight of said grain holder based on an output from said at least one load sensing device, and a display means for displaying the calculated weight.

26. The grain cart of claim 25, wherein said weight is calculated as being proportional to the measured force of said portion of said frame applied to said at least one load sensing device.

* * * * *